(No Model.)
A. R. MOSELEY & C. BENBON.
NUT LOCK.
No. 439,540. Patented Oct. 28, 1890.
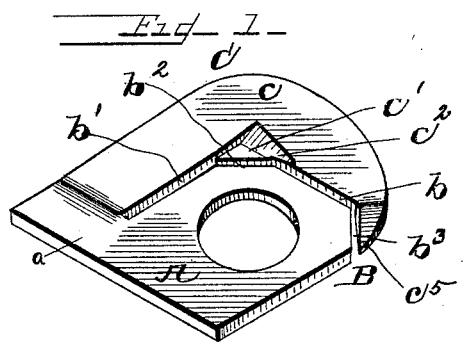
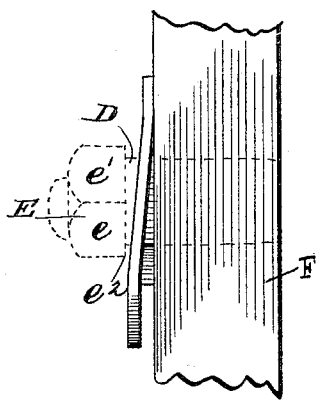 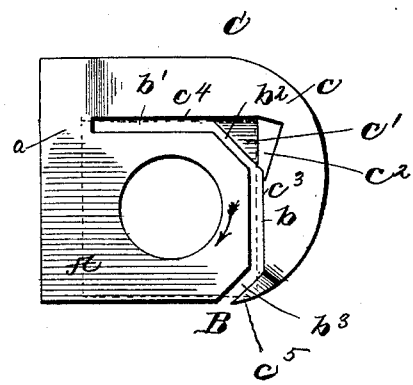
Witnesses:
G. A. Fauberschmidt
R. C. Johnson
Inventors:
A. R. Moseley
Charles Benbon,
By their Attorneys,
Higdon & Higdon.

UNITED STATES PATENT OFFICE.

ARTHUR R. MOSELEY AND CHARLES BENBON, OF LA CROSSE, KANSAS.

NUT-LOCK.

SPECIFICATION forming part of Letters Patent No. 439,540, dated October 28, 1890.

Application filed May 27, 1890. Serial No. 353,331. (No model.)

*To all whom it may concern:*

Be it known that we, ARTHUR R. MOSELEY and CHARLES BENBON, of La Crosse, Rush county, Kansas, have invented certain new and useful Improvements in Nut-Locks, of which the following is a full, clear, and exact description, reference being had to the accompanying drawings, forming a part hereof.

Our invention relates to certain new improvements in nut-locks; and it consists of a washer situated between the nut and the work, the said washer having a spring attached thereto and surrounding two sides of the nut, the spring being formed by a slot in the washer, the central part of such spring being sprung upward and having a recess in the upper face, which is adapted to receive a corner of the nut; and it further consists in the details of construction as will be hereinafter described and claimed.

Referring to the accompanying drawings, in which corresponding parts are designated by similar letters, Figure 1 is a perspective view of the washer constructed according to this invention. Fig. 2 is a side view thereof; and Fig. 3 is a plan view of the washer, showing in dotted lines the nut locked in position.

The washer A preferably consists of spring metal—such as steel—and has a slot B therein. The shape of this slot is fully shown in Fig. 1, and it will be noticed that it consists of two main parts $b$ and $b'$, running at right angles to each other and connected together by the shorter inclined portion $b^2$, the part $b$ opening upon the side of the washer by an inclined portion $b^3$, forming a nose $c^5$ upon the spring. The part $b'$ of the slot does not communicate with the side of the washer, but leaves a tongue $a$, which connects the spring C therewith. The central portion $c$ of the spring is sprung above the upper face of the washer, its ends sloping gradually until they are flush therewith. The central portion $c$ of the spring has a recess or depression $c'$ in its upper surface, and it will be seen that this depression is located at the corner formed by the junction of the parts $b$ $b'$ and $b^2$ of the slot. That face $c^2$ of this depression which the corners of the nut strike in being screwed into place is beveled, the opposite face thereof being square.

D represents a bolt with a washer constructed in accordance with my invention placed thereon, and E a nut above said washer.

$e$ and $e'$ are faces of the nut E, and $e^2$ one of the lower corners thereof.

$c^3$ and $c^4$ represent the outer faces, respectively, of parts $b$ and $b'$ of the L-shaped slot B.

F is a timber through which the bolt D passes.

The operation of my invention is obvious from an inspection of Fig. 3 of the drawings; but it may be here stated that the washer A being placed upon the bolt D the nut E is screwed in place, forcing the washer down, and as the rotation of the nut (which is of such a size as to cause two of its sides to register with the parts $b$ and $b'$ of the slot B) is continued the corners thereof will strike the beveled face $c^2$ of the depression, forcing the spring C down, and this may be continued until the nut has been clamped sufficiently upon the washer and until one of the corners of the nut rests within the depression $c'$ of the spring, all of the parts now having the position shown in Fig. 3. It is evident that the nut cannot now by jarring be moved in a direction contrary to the arrow in the last-mentioned figure, (which would unscrew it,) as the sides $e$ $e'$ thereof will bear upon the sides $c^3$ and $c^4$ of the spring, respectively, while the nose $c^5$ of the spring will project under a corner $e^2$ of the nut.

If it be desired to loosen or remove the nut, it may be done by applying considerable leverage thereto by any suitable means, thus causing the sides $e$ $e'$ of the nut to overcome the resistance of the spring to depression, permitting the nut to slide over the spring in a direction contrary to that of the arrow. It will be noticed that by making the slot of a substantially L shape the spring engages two sides of the nut, thus giving an extensive locking-surface.

Having thus described our invention, what we desire to claim is—

A nut-lock consisting of a washer formed of spring metal, having a slot therein, the said slot consisting of two main parts running at right angles to each other and connected by an inclined part, that portion of the said washer exterior to the said slot being sprung upward and having a depression in the central portion of its upper surface, the said depression having an inclined face, one of the ends of the sprung portion having a nose thereon projecting under the said nut, as described.

In testimony whereof we affix our signatures in presence of two witnesses.

ARTHUR R. MOSELEY.
CHARLES BENBON.

Witnesses:
F. K. GROVES,
R. D. BAILEY.